United States Patent [19]

Gordon

[11] Patent Number: 4,872,508
[45] Date of Patent: Oct. 10, 1989

[54] OIL WELL PUMP LEAKAGE ACCUMULATOR

[76] Inventor: Richard W. Gordon, 224 "B" St., Taft, Calif. 93268

[21] Appl. No.: 264,793

[22] Filed: Oct. 31, 1988

[51] Int. Cl.$^4$ .............................................. E21B 33/08
[52] U.S. Cl. ...................................... 166/84; 166/66; 166/68; 166/96; 277/19
[58] Field of Search .................... 166/84, 86, 81, 72, 166/68, 96, 54, 113, 105.2, 105.4, 53, 66; 277/19, 20, 59

[56] References Cited

U.S. PATENT DOCUMENTS

| | | | |
|---|---|---|---|
| 1,942,597 | 1/1934 | Hewgley | 166/96 X |
| 2,096,882 | 10/1937 | Chernosky | 166/81 |
| 2,163,327 | 6/1939 | Shaffer | 166/81 |
| 2,322,453 | 6/1943 | Kaveler | 166/5 X |
| 3,270,810 | 9/1966 | Johnston | 166/84 |
| 3,353,606 | 11/1967 | Dyer | 166/84 |
| 4,530,397 | 7/1985 | Calhoun | 166/84 |
| 4,665,976 | 5/1987 | Retherford | 166/84 X |

Primary Examiner—Stephen J. Novosad
Attorney, Agent, or Firm—Jack C. Munro

[57] ABSTRACT

An accumulator to be mounted in conjunction with an oil well pump which has a reciprocating polish rod. The polish rod is mounted in conjunction with the stuffing box of the oil well pump. The accumulator is attached to and sealed relative to the ambient to the stuffing box. The accumulator includes an internal chamber with any liquid leakage from the stuffing box being conducted into the internal chamber. Located within the internal chamber is a pressure diffusing plate assembly to diffuse any excess pressure being released from the stuffing box. Any accumulated liquid within the internal chamber of the accumulator is to be conducted through an outlet from the accumulator and deposited at an appropriate exterior location.

2 Claims, 3 Drawing Sheets

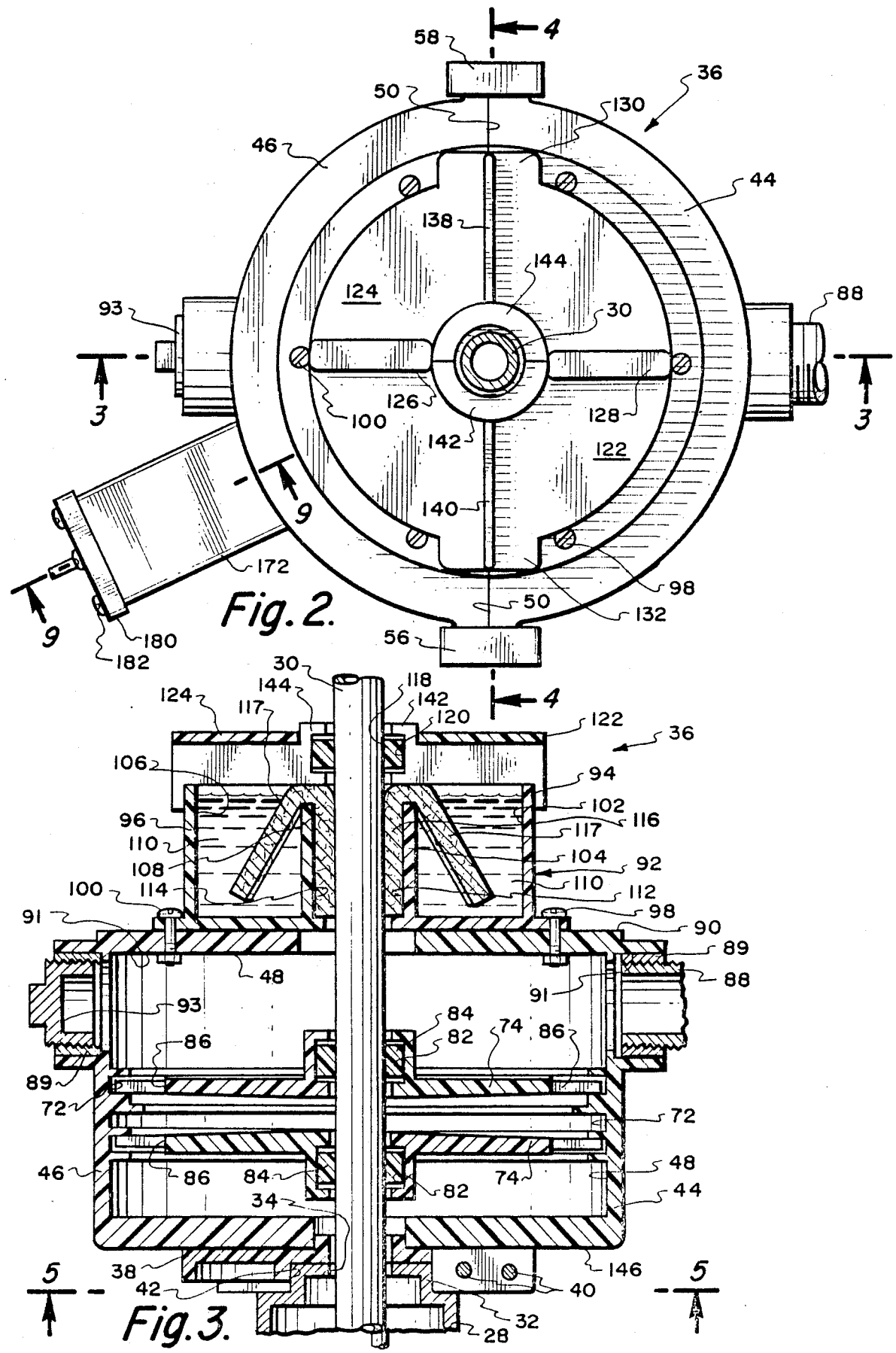

OIL WELL PUMP LEAKAGE ACCUMULATOR

BACKGROUND OF THE INVENTION

The field of this invention relates to oil well pumps and more particularly to an attachment to an oil well pump which is to eliminate ambient leaking of oil exteriorly of the stuffing box of the oil well pump.

Conventional oil wells utilize a polish rod which penetrates to the lower portion of the oil well and extends above the surface of the earth a short distance. The polish rod passes through a wellhead which is usually mounted at the surface of the earth. From the wellhead is located appropriate piping which terminates at its upper end at a stuffing box. A polish rod is conducted through the stuffing box and the piping. The polish rod is moved reciprocally in a slow continuous manner in order to affect the pumping of the oil.

The stuffing box contains a wiper assembly whose purpose is to wipe any liquid adhering to the polish rod and prevent such from being conducted exteriorly of the stuffing box into the ambient. The oil that is being pumped by the movement of the polish rod is to be conducted into appropriate piping to be deposited in a collecting reservoir usually spaced some distance from the oil well pump. During the pumping operation there is a liquid pressure created. This liquid pressure is applied to the stuffing box. The sealing mechanism within the stuffing box, even if slightly worn, will permit oil to be conducted into the ambient. It is very difficult to maintain a high quality seal between the stuffing box and the polish rod since the polish rod is constantly moving and wear occurs quickly.

Not all the time does liquid leak slowly from the stuffing box. There are instances when a surge of pressure is applied to the stuffing box which results in the stuffing box literally exploding and spraying the surrounding area with oil. If per chance the oil well happens to be located within an orchard, there will undoubtedly occur damage to the trees and this damage will have to be compensated by the owner of the oil well. In the case of an orchard, it may take years before the damage is completely repaired. Damage can also be most undesirable in residential areas, commercial areas, etc.

At the present time, there is much concern about polluting of the environment. There are laws in most communities which prohibit the seeping of any oil directly onto the ground even in the area immediately surrounding the oil well.

In the past, in order to avoid any leakage, the sealing mechanism within a stuffing box has been frequently replaced. This frequent replacement of the sealing mechanism becomes a significant expense and over a period of a year can become quite a significant cost. In any event, even with frequent replacement of the sealing mechanism within a stuffing box, it is known that leakage can reoccur within a short period of time.

There is a need to somehow prevent leakage of any oil from an oil well directly onto the ground whether this leakage occurs explosively or slowly.

SUMMARY OF THE INVENTION

The structure of the present invention relates to an attachment for a conventional oil well pump. Each conventional oil well pump utilizes a reciprocating polish rod which is allegedly sealed from the ambient by a stuffing box. The attachment of the present invention relates to an accumulator housing which is composed of a pair of parts which are to be clamped together about the polish rod and sealed at its lower end in conjunction with the stuffing box. The polish rod passes through this accumulator and the upper, outer end of this accumulator includes a wiper assembly which is to remove any oil which is clinging to the polish rod. The accumulator housing includes an internal chamber within which is located a plurality of pressure diffusing plates. Any oil that leaks from the stuffing box is to be conducted into the internal chamber of the accumulator. If excessive pressure is produced within the accumulator, this excessive pressure will be diffused to a tolerable level by these pressure diffusing plates. The oil, as it accumulates within the internal chamber of the accumulator, is conducted through an outlet pipe to be deposited at an appropriate desired depositing location such as within a tank. There may be incorporated a liquid level sensor in conjunction with the accumulator housing which upon level of the oil within the internal chamber of the housing reaching a certain level. An annunciator of some form is activated to provide a warning that an appropriate maintenance procedure is needed in order to correct excessive leakage from the stuffing box.

The primary objective of the present invention is to construct a device which will essentially prohibit the leaking into the ambient of any oil from an oil well.

Another objective of the present invention is to construct a device which can be applied directly onto a conventional oil well without requiring any modification of the oil well itself, it only being that the device of the present invention is mounted directly onto the oil well.

Another objective of the present invention is to provide a device which warns of excess leakage in conjunction with the oil well thereby informing maintenance individuals aware that maintenance of the oil well is required.

Another objective of the present invention is to construct a device which can be assembled onto the oil well by relatively unskilled individuals thereby no requiring any unusual skills for installation of the device.

BRIEF DESCRIPTION OF THE DRAWINGS

FIG. 2 is a top plan view of the apparatus of the present invention taken along line 2—2 of FIG. 1;

FIG. 3 is a cross-sectional view through the apparatus of the present invention taken along line 3—3 of FIG. 2;

DETAILED DESCRIPTION OF THE SHOWN EMBODIMENT

Figure 6:
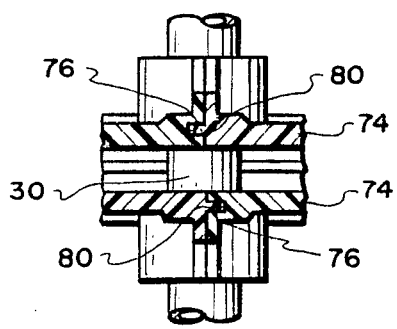
FIG. 6 is a cross-sectional view through a portion of the pressure diffusing plates utilized in conjunction with the apparatus of the present invention taken along line 6—6 of FIG. 4.
Figure 1:
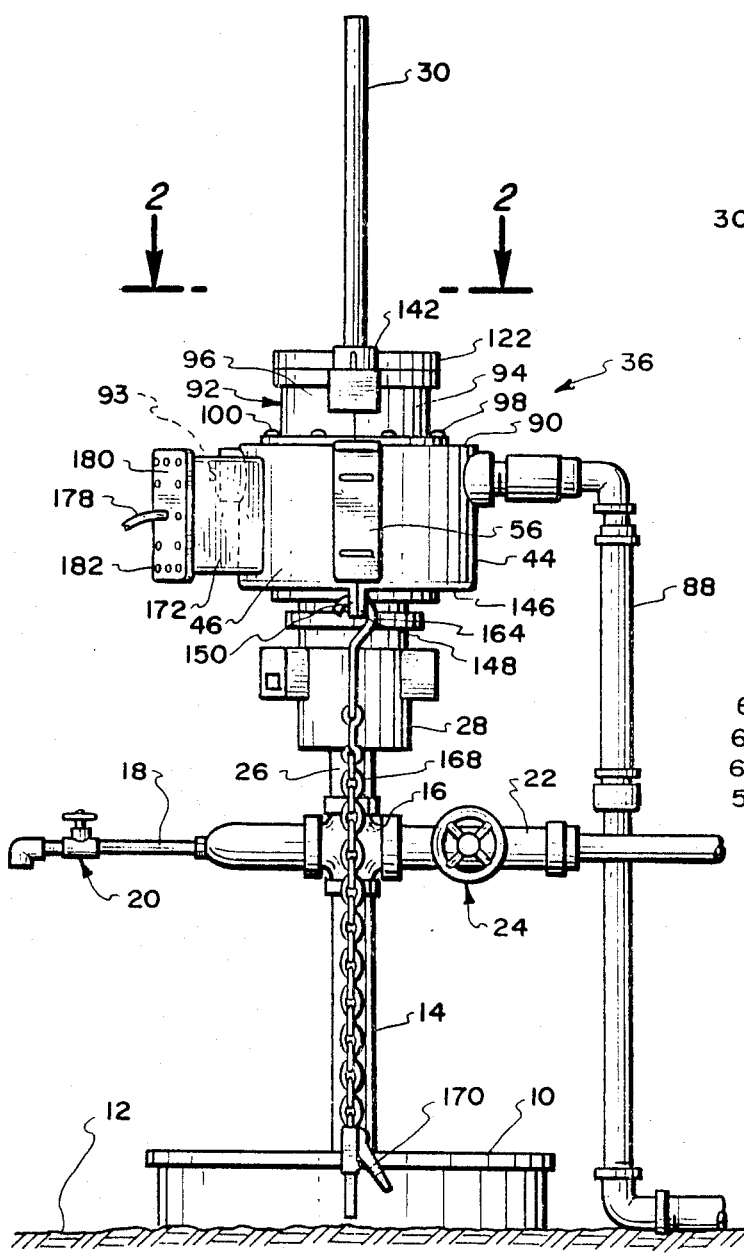
FIG. 1 is a side elevational view of the wellhead of a conventional oil well upon which there has been installed the apparatus of the present invention.
Figure 7:
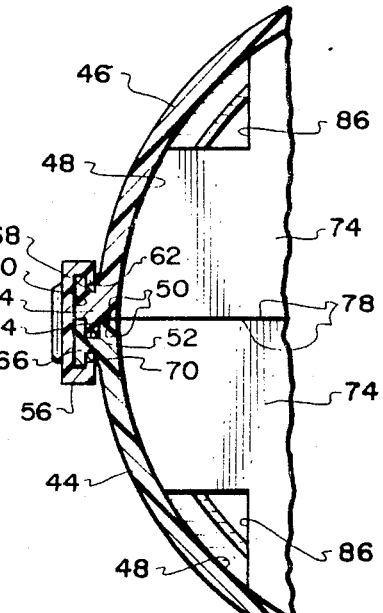
FIG. 7 is a cross-sectional view through the clamping together arrangement of parts of the accumulator housing taken along line 7—7 of FIG. 4.
Figure 8:
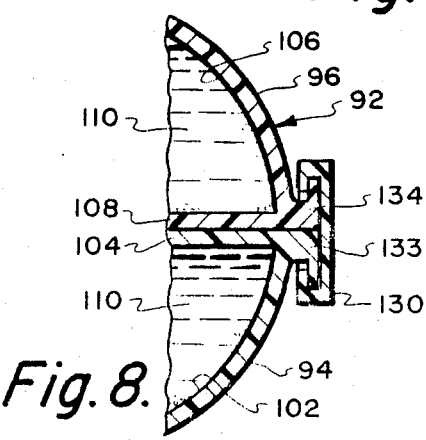
FIG. 8 is a cross-sectional view through a second clamping arrangement utilized in conjunction with the polish rod lubricating section of the apparatus of the present invention taken along line 8—8 of FIG. 4.

Referring particularly to the drawings, there is shown a conventional oil well which has a wellhead 10 located at the surface 12 of the earth extending above the wellhead 10 is a pipe 14 which is connected by a fitting 16 to a drain pipe 18. This drain pipe 18 is normally closed by a manually operated shut-off valve 20. Fitting 16 is also connected to a discharge pipe 22. The discharge pipe 22 is normally open and is to permit discharge of the pump oil to an exterior collecting location such as a reservoir (not shown). However, the discharge pipe 22 can be manually closed by means of manually operated valve 24.

Also connecting with the fitting 16 is a pipe 26. Pipe 26 is connected to a stuffing box 28. Conducted through the stuffing box 28 is a polish rod 30. This polish rod 30 is to be reciprocally driven on a continuous basis from a pumping mechanism (not shown). The polish rod 30 is conducted through the stuffing box 28, pipe 26, fitting 16, through pipe 14, the wellhead 10 to oil pumping and valving structure located within the well some distance below the surface 12 of the earth.

The upper surface of the stuffing box 28 is formed into an annular collar 32. The annular collar 32 includes a centrally disposed opening 34. It is noted that in referring to FIGS. 3 and 4 of drawings that the opening 34 is oversized relative to the collar 32. Although there is to be included within the stuffing box 28 a sealing structure which is to prevent oil from being conducted through the space between wall of the opening 34 and the polish rod 30, inherently, this sealing structure will wear and leakage of oil therebetween will occur. The apparatus 36 of the present invention is mounted in conjunction with the stuffing box 28 and specifically in conjunction with this collar 32.

The apparatus 36 utilizes a sealing plate 38 which is composed of two parts which are securely connected together by a plurality of bolt fasteners 40. Sealing plate 38 includes a centrally disposed hole 42. Hole 42 is to be snugly located about exterior surface of the collar 32.

The preferable material of construction of the sealing plate 38 as well as the bulk of the apparatus 36 of this invention comprises an oil resistant elastomer (nitril rubber) similar to rubber. A desirable material is sold under the Tradename of Geolast manufactured by Monsanto Chemical Company of the United States of America. This material is exceedingly strong and yet is somewhat flexible and is capable of lasting for an extremely long period of time.

Other features of the Geolast is that it has high heat resistance and high impact resistance (beyond steel with only a fraction of the weight of steel). Geolast is also resistant to all natural solvents and corrosion. The specific material of the present invention is designed to include carbon with this carbon acting as an electrical ground so, therefore, static electricity is substantially eliminated.

Mounted on the sealing plate 38 is an accumulator in the form of a housing composed of two substantially identical housing sections 44 and 46. The housing sections 44 and 46 are each in essence one-half a cylinder in configuration. Each of the housing sections 44 and 46 are basically hollow and when joined together form an internal chamber 48. The liquid volume of the chamber 48 can be increased or decreased. It has been found that a three gallon capacity is generally more than adequate. At the joining together of housing sections 44 and 46, each have a peripheral edge, the right side of which (referring to FIG. 4 of the drawings) includes a U-shaped groove 52 and the left side of which includes a U-shaped protuberance 54. When the housing sections 44 and 46 are reversed and connected together, the protuberance 54 of each of the sections 44 and 46 is located in a snug fitting manner within the groove 52 of the other of the sections 44 and 46. Thereby a substantially liquid-tight connection is established between the housing sections 44 and 46.

To hold the sections 44 and 46 in tight connection, there is utilized a pair of tongues 56 and 58. Each of the tongues 56 and 58 are identical and each include an elongated slot 60. A narrow slot 62 provides access into the wider slot 60. Within the slots 60 is to be located abutting protuberances 64 and 66 with protuberance 64 being mounted on the housing section 46 and the protuberance 66 being mounted on the housing section 44. It is to be understood that there are two in number of the protuberances 64 with such being located substantially diametrically apart, and the same is true for protuberances 66. Each mating pair of protuberances 64 and 66 fit within an elongated slot 60 in a tight fitting manner with the narrow slot 62 connecting with slot 68 of protuberance 64 and slot 70 of protuberance 66. In this manner, the tongues 56 and 58 tightly secure together the housing sections 44 and 46 but are capable of being slid off of the protuberances 64 and 66 to provide for separation of the housing sections 44 and 46 permitting installation and maintenance.

Within the internal chamber 48 there are formed a series of annular grooves 72. Within these annular grooves 72 there is mountingly supported a pair of diffuser plates 74. Each of the diffuser plates 74 are identical in construction and are mounted in a reversed facing relationship with respect to each other. Each of the plates 74 are actually constructed of two identical halves with one half being located within housing section 46 and the other half being located within housing section 44. It is to be noted that the diffuser plates 74 can be moved to various positions (depending upon the number of the grooves 72) within the internal chamber 48. Also, the number of the diffuser plates 74 could be increased (space permitting) or decreased if such is deemed to be desired.

To connect together the two halves of a single plate 74, there is formed a groove 76 within the abutting face 78 of the plate 74. Also, there is located an elongated protuberance 80. When the two halves of the plate 74 are abutted together, the protuberance 80 of one half is snugly located within the groove 76 of the other half. The cooperating halves forming the plate 74 have a central hole 82. Within the hole 82 there is snugly located a ring 84. Each ring 84 is split so that it can be slipped over the polish rod 30. It is to be understood that the polish rod 30 is to be freely slideable within each of the rings 84.

Each of the plates 74 include a plurality of cutout sections such as cutout sections 86 located directly adjacent the peripheral edge of each of the plates 74. The purpose of the cutout sections 86 is so as to provide a channel for crude oil that is rising within the internal chamber 48 flowing from opening 34. If perchance the crude oil is forced through the opening 34 is under high pressure, the plates 74 function to diffuse this pressure. It has been found that the apparatus 36 of this invention can actually withstand a pressure as great as twenty-five hundred pounds per square inch of crude oil being conducted through the opening 34.

As the crude oil rises within the internal chamber 48, such will be permitted to flow through pipe 88 to be deposited at some collecting reservoir (not shown) located some spaced distance from the wellhead 10. The pipe 88 is threadably connected to threaded sleeve 89 which is fixedly mounted within hole 91 formed through the side wall of each of the sections 44 and 46. It is to be noted that one of the threaded sleeves 89 is closed by means of a cap 93. Generally, it only will be necessary that a single pipe 88 be utilized. However, because there are two separate holes 91, the user has a choice which hole 91 to select.

It has also been discovered that during the outward portion of the reciprocating movement of the polish rod 30 that it is necessary to keep fluid from passing by the surface of the polish rod 30 into the ambient. Also, it has been found to be desirable to add lubrication to the polish rod during the downward movement of the polish rod 30 in order to minimize wear of the polish rod 30 during usage. For this purpose, there is secured to the top surface 90 of the apparatus 36 (formed by sections 44 and 46) a lubricating housing 92. This lubricating housing 92 is formed of two half cylindrical shaped sections 94 and 96. Section 94 is fixedly mounted by fasteners 98 to the top surface 90 of the housing section 44. In a similar manner, the section 96 is fixedly attached by fasteners 100 to the top surface 90 of the section 46. The section 94 is different from the section 44 in that where section 44 is normally open to within its internal chamber 48, the lubricating chamber 102 of the section 94 is closed off by a wall 104. In a similar manner the lubricating chamber 106 of the section 96 is closed off by a wall 108. Therefore, the lubricating housing 92 includes two separate lubricating chambers 102 and 106. Within each of the chambers 102 and 106, there is to be located a quantity of lubricating oil 110.

Centrally disposed within the wall 104 is a half cylinder recess 112. A similar half cylinder recess 114 is formed within the wall 108. The sections 94 and 96 are connected together in abutting relationship with the recesses 112 and 114 forming a cylindrical chamber about the polish rod 30. Within this cylindrical chamber is to be located a fabric wick 116. Integrally attached to the wick 116 are a plurality of flaps 117 which are to be bent over and extend within the chambers 102 and 106 in contact with the oil 110. The oil 110 impregnates the flaps 117 and the portion of the wick 116 that is in contact with the polish rod 30 and thereby keeps the polish rod 30 covered with a light coating of oil during operation of the rod 30.

To prevent seepage of any of this lubricating oil 110 into the ambient, there is utilized a seal 118 to wipe the polish rod 30 during its upward stroke. This seal 118 is to be split and slipped around the polish rod 30 and is encased within a sealing chamber 120 which is formed when cover sections 122 and 124 connect together.

These cover sections 122 and 124 are to be located about the polish rod 30 each in a slightly skewed position. When the cover sections 122 and 124 are moved so that their upper surfaces are in a horizontal alignment, a ridge (not shown) on the cover 124 engages within a slot of an elongated leg member 126 and in a similar manner a ridge on the cover 122 snugly fits within a slot formed within elongated leg member 128. In this manner, the covers 122 and 124 are secured together with the seal 118 being properly positioned about the polish rod 30.

Figure 4:
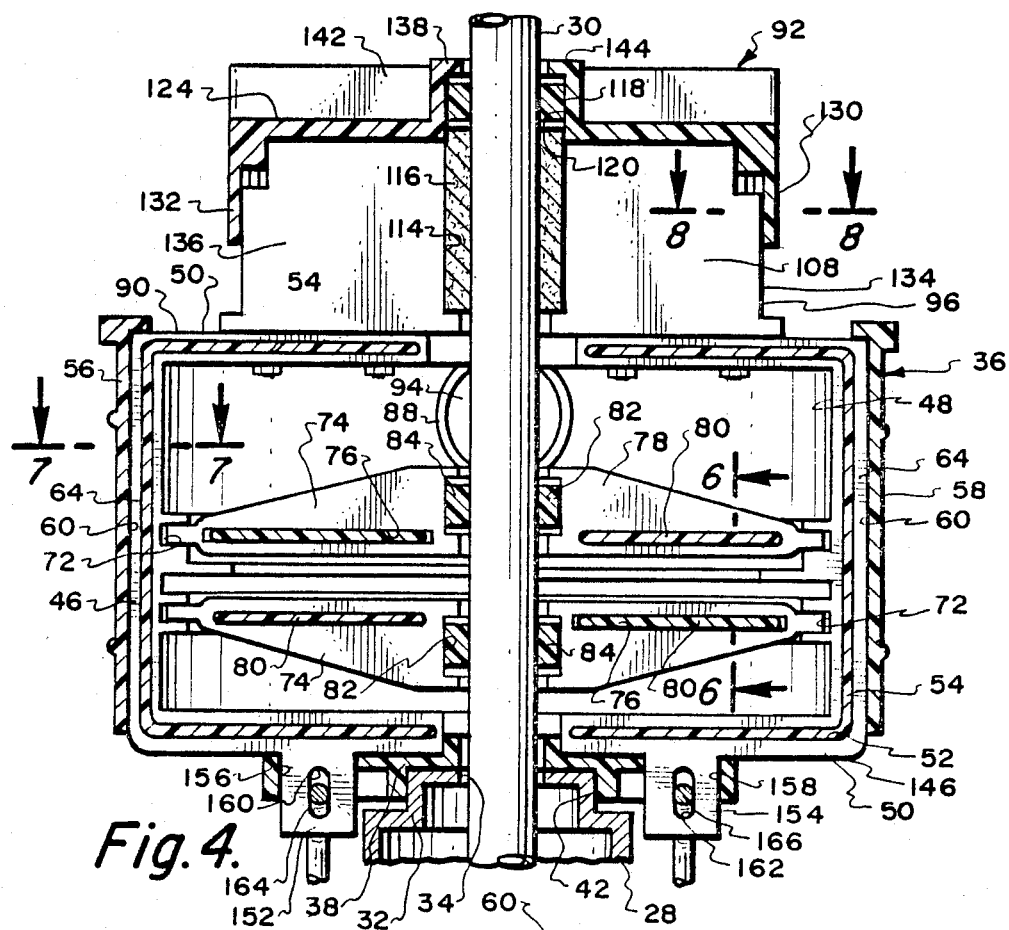
FIG. 4 is a cross-sectional view through the apparatus of the present invention taken along line 4—4 of FIG. 2 which is in a direction perpendicular to the cross-sectional view of FIG. 3.
Figure 5:
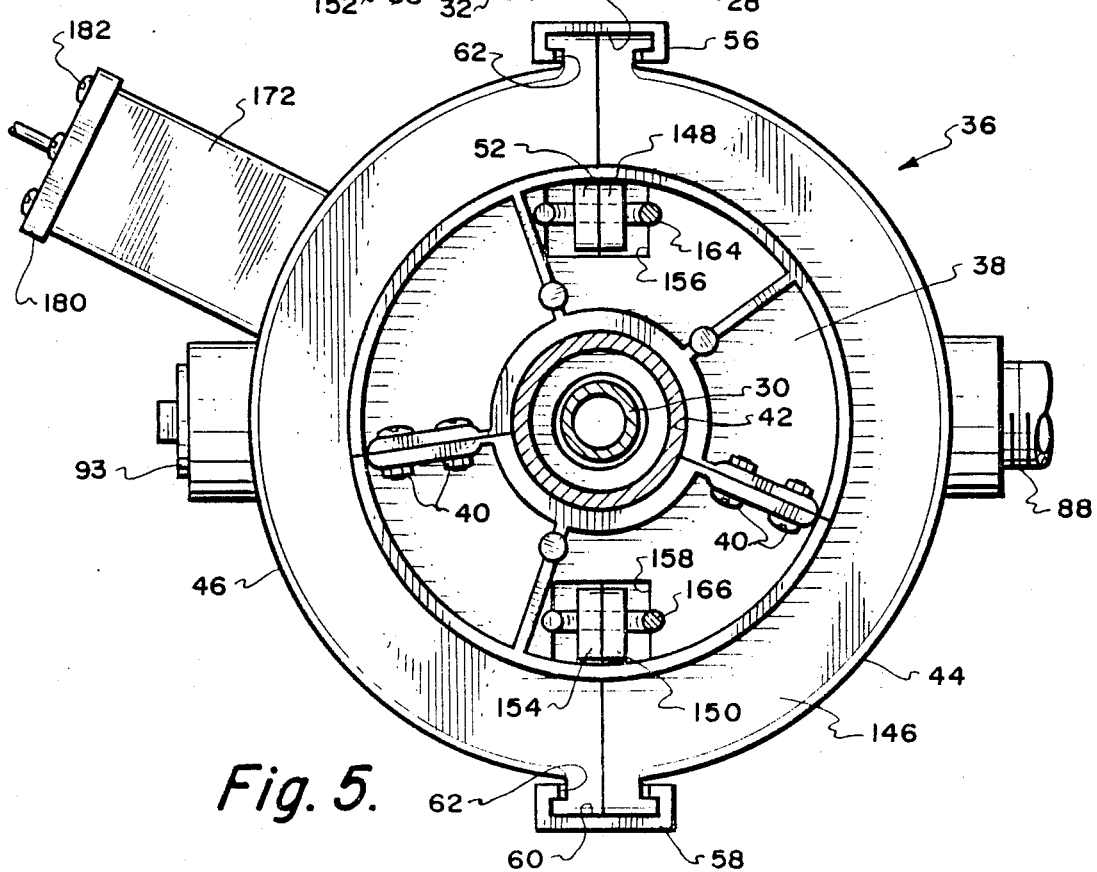
FIG. 5 is a bottom view, partly in cross-section, of the apparatus of the present invention taken along line 5—5 of FIG. 3.

The cover sections 122 and 124 are then slid in a downward position until tongues 130 and 132 slide over a rail assembly composed of a pair of abutting protuberances located on each side of each of the sections 122 and 124. Referring particularly to FIG. 4, protuberances 134 and 136 are shown for section 124. There is protuberance 133 shown for the lubricating housing section 94 and this protuberance 133 abuts against the protuberance 134 forming the rail which is to be engaged by tongue 130. The protuberance abutting against protuberance 136 is not shown. In essence, the sections 94 and 96 of the lubricating housing 92 are secured together in a manner similar to the securing together of the separate sections 44 and 46 of the apparatus 36.

It is to be understood that the cover sections 122 and 124 can be manually slipped off of the lubricating housing 92 so that the quantity of lubricating oil 110 can be checked and added to if necessary. Cover section 124 includes a strengthening ridge 138 located mid-angularly displaced between the leg members 126 and 128. In a similar manner, a strengthening ridge 140 is located midway between the leg members 126 and 128 on the cover section 122. The cover section 122 includes a half circular seal retainer 142 which is to restrain in position the seal 118. In a similar manner the cover section 124 includes a half circular seal retainer 144 for the same purpose.

Integrally attached on the bottom surface 146 of the housing section 44 are a pair of diametrically spaced apart attaching lugs 148 and 150. In a similar manner, similarly mounted on the bottom surface 146 of the section 46 is a similar pair of lugs 152 and 154. With the sections 44 and 46 connected together, the lugs 148 and 152 abut together and the lugs 150 and 154 abut together. The combined lugs 148 and 152 extend through an opening 156 formed within the sealing plate 38. In a similar manner, the combined lugs 150 and 154 extend through an opening 158 formed within the sealing plate 38.

Each of the lugs 148 and 152 include a hole which forms a combined through opening 160. The lugs 150 and 154 also each include a hole which forms a combined through opening 162. Within the through opening 160 is to be located a metallic hook 164. A similar metallic hook 166 is to be located within the through opening 162. The hook 164 is connected to a length of chain 168. In a similar manner, hook 166 is connected to a length of chain (not shown). The free or lower end of the chain 168 is connected to a chain tightening mechanism 170 and then connected to the wellhead 10. The structure of the chain tightening mechanism 170 is deemed to be conventional and forms no specific part of this invention. It is just being understood that the mechanism 170 is for the purpose of drawing taut the chain 168. It is to be understood that the opposite length of chain attached to the hook 166 will include a similar chain tightening mechanism and also will be attached to the wellhead 10.

The chains and their respective hooks 164 and 166 function as a tie down device to fix the position of the apparatus 36 of this invention relative to the wellhead 10. If perchance an explosive amount of pressure is applied to within the internal chamber 48, this tie down arrangement will tightly hold the apparatus 36 of this invention in its proper position with such not being permitted to be pushed upwardly along the polish rod 30.

Figure 9:
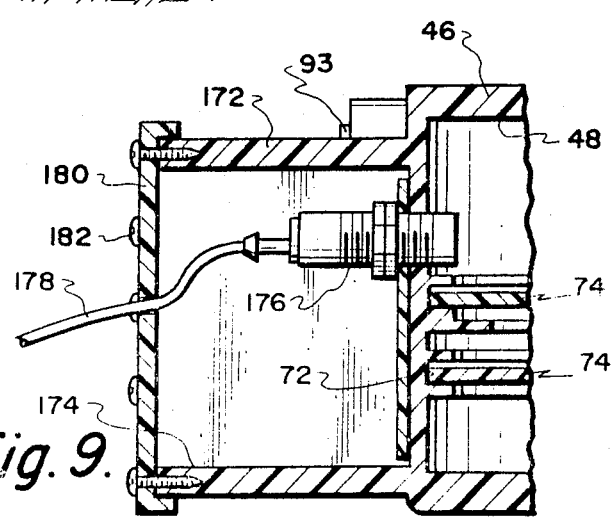
FIG. 9 is a cross-sectional view taken along line 9—9 of FIG. 2 showing the liquid level sensing device utilized in conjunction with the apparatus of the present invention.

Integrally attached to the section 46 is a sensor housing 172. The sensor housing 172 includes an internal chamber 174. Within this internal chamber 174 is located a sensor 176. This sensor 176 is fixedly mounted within the chamber 174 in a desired manner. It is not necessary for the sensor 176 to penetrate into the internal chamber 48 although such is shown within FIG. 9 of the drawings. There are sensors that are manufactured that are sensitive enough to ascertain the level of a liquid through the wall surface and need not come into direct contact with the crude oil within the chamber 48. A desirable form of this sensor would be what is known as a compacitive sensor which include an amplifier such as Model EC 30, manufactured by EURO-NORM Corporation of the United States of America. However, it is to be understood that numerous types of sensors could be utilized.

Energy is to be supplied to the sensor 176 and also the sensing signal is to be emitted from the sensor 176 through a cable 178. This cable 178 is to be connected to an appropriate annunciator in some form such as a warning light, a horn, a switch to turn off the oil well pump, or possibly even access to a computer. The sensor housing 172 is to be closed to the ambient by means of a cover 180. Cover 180 is fixedly mounted to the sensor housing 172 by means of fasteners 182.

Although not shown in the drawings, the sections 44 and 46 may include within the bottom surface 146 drain outlets to permit bleeding off of any crude oil contained within the chamber 48. The purpose of this bleeding off is for a visual inspection and also to drain off the crude oil prior to the assembly of the apparatus 36 for servicing of the stuffing box 28.

What is claimed is:

1. In combination with an oil well sump pump which has a reciprocating polish rod, said polish rod being mounted within a stuffing box, said polish rod extending exteriorly of said stuffing box, the improvement comprising:

an accumulator mountable about said polish rod, said accumulator being connected in a liquid-tight manner to said stuffing box preventing leakage of liquid from said stuffing box into the ambient, said accumulator having an internal chamber;

a liquid passage located between said polish rod and said accumulator adjacent said stuffing box, said liquid passage connecting with said internal chamber, any liquid leakage from said stuffing box along said polish rod is caused to flow through said passage into said internal chamber and collect in said internal chamber; and said accumulator being formed of a two part housing, said two part housing being clamped together about said polish rod, each said part of said housing including a pair of protuberances, each said protuberance of one part of said housing abutting against a said protuberance of the other part of said housing forming a pair of rails, a tongue member being slidingly engageable with each said rail thereby tightly holding together said two parts of said housing.

2. In combination with an oil well sump pump which has a reciprocating polish rod, said polish rod being mounted within a stuffing box, said polish rod extending exteriorly of said stuffing box, the improvement comprising:

an accumulator mountable about said polish rod, said accumulator being connected in a liquid-tight manner to said stuffing box preventing leakage of liquid from said stuffing box into the ambient, said accumulator having an internal chamber;

a liquid passage located between said polish rod and said accumulator adjacent said stuffing box, said liquid passage connecting with said internal chamber, any liquid leakage from said stuffing box along said polish rod is caused to flow through said passage into said internal chamber and collect in said internal chamber; and a pressure diffusing plate assembly located within said internal chamber, said pressure diffusing plate assembly comprising a plurality of plates located in an axially spaced apart manner relative to said polish rod, said pressure diffusing plate assembly being for the purpose of diffusing excessive accumulated liquid pressure within said internal chamber, each said plate including at least one cutout section, each said cutout section being radially spaced from said polish rod, said cutout sections to provide a path for flow of oil between and by said plates.

* * * * *